United States Patent [19]
Woodward

[11] 3,769,101
[45] Oct. 30, 1973

[54] LIQUID INTERFACE DIFFUSION METHOD OF BONDING TITANIUM AND TITANIUM ALLOY HONEYCOMB SANDWICH PANEL STRUCTURE

[75] Inventor: James R. Woodward, El Cajon, Calif.

[73] Assignee: Rohr Industries, Inc., Chula Vista, Calif.

[22] Filed: June 28, 1971

[21] Appl. No.: 157,560

Related U.S. Application Data

[63] Continuation-in-part of Ser. No. 765,156, Oct. 4 1968.

[52] U.S. Cl............ 148/127, 29/487, 29/498, 29/504, 148/131, 148/133
[51] Int. Cl. ............... C22f 1/18, B23k 35/30
[58] Field of Search............ 148/131, 11.7, 127, 148/133, 32.5, 34; 29/191, 487, 198, 498, 504, 494; 75/175.5, 134

[56] References Cited
UNITED STATES PATENTS

| | | | |
|---|---|---|---|
| 2,822,269 | 2/1958 | Long | 75/175.5 |
| 2,847,302 | 8/1958 | Long | 29/198 |
| 2,906,008 | 9/1959 | Boegehold et al. | 29/198 X |
| 3,222,775 | 12/1965 | Whitney | 29/498 X |
| 3,417,461 | 12/1968 | Wells et al. | 29/198 X |
| 3,442,010 | 5/1969 | Albers | 29/498 X |
| 3,455,663 | 7/1969 | Zdanuk | 29/198 |
| 3,466,737 | 9/1969 | Hanink | 29/198 |
| 3,660,891 | 5/1972 | Martin | 29/504 |

FOREIGN PATENTS OR APPLICATIONS

| | | | |
|---|---|---|---|
| 833,758 | 4/1960 | Great Britain | 29/504 |

OTHER PUBLICATIONS

The Science, Technology and Application of Titanium Jaffee, Dec. 1970, Pergamon Press, N.Y., pp. 699–729.

Primary Examiner—Charles N. Lovell
Attorney—George E. Pearson

[57] ABSTRACT

A liquid interface diffusion process, for bonding titanium or titanium alloys wherein at least one of the titanium type materials to be fayed is sequentially plated with a total weight of from between 1 and 3 gms/ft$^2$ of at least three selected metals or an alloy made therefrom. The faying surfaces are then held together to maintain position on alignment, placed in a protective atmosphere, the temperature of the materials are then raised at a controlled rate causing sufficient solid state diffusion to occur and a liquid to form continuing to increase the temperature to a predetermined level and holding at this temperature until a solidification occurs and sufficient additional solid state diffusion occurs producing a desirable dilution of bridge material and titanium at the joint, and then reducing the temperature at a controlled rate to a lower temperature to complete the bonding cycle. An additional step of heat curing under protective atmosphere is required after the bonding of beta type titanium alloys, for providing additional precipitation sites and precipitation of the alpha phase for strengthening of the basis materials.

14 Claims, 17 Drawing Figures

INVENTOR.
JAMES R. WOODWARD

INVENTOR.
JAMES R. WOODWARD

LIQUID INTERFACE DIFFUSION METHOD OF BONDING TITANIUM AND TITANIUM ALLOY HONEYCOMB SANDWICH PANEL STRUCTURE

CROSS-REFERENCE TO RELATED APPLICATION

This is a continuation in part of pending U.S. Pat. application Ser. No. 765,156, filed Oct. 4, 1968, for Combined Brazing-Diffusion Method of Bonding Metallic Honeycomb Sandwich Panel Structure, by the same applicant, and assigned to the same assignee, as the present application.

BACKGROUND OF THE INVENTION

This invention relates generally to liquid interface diffusion bonding of titanium and titanium alloy materials more specifically honeycomb core sandwich panels in which liquid and solid state diffusion is utilized to establish a physical bond between the faying surfaces of joined materials.

Brazing and diffusion bonding methods for the joining of honeycomb sandwich panel structures have hereinbefore been known and separately used with some degree of success but have not been found to be entirely satisfactory in service for reasons hereinafter set forth.

The brazing method requires fusion of a filler metal or alloy which upon becoming molten flows by capillary action into the ever present voids along the faying surfaces of the base metal parts to be joined. There is no fusion of the base metal itself. The brazing process thus adds another filler metal, or metals, to the basic metal system to effect a joint therebetween. This added metal not only often flows to surface areas other than those required to effect the brazed joint but also significantly adds to the weight of the bonded structure. For example, an added weight of 80 grams per square foot of honeycomb sandwich panel using 2 mls. brazing alloy foil is common.

Filler metals which do not rapidly diffuse into the base metal are considered to be non-reactive; those which rapidly diffuse into the base metal being considered reactive. The filler metal or alloy has a melting point much lower than that of the base metal of the parts being joined, and these lower melting fillers often react with the base metal with resultant degradation of its properties. Titanium, for example, is difficult to braze because it is highly reactive with most filler metals. In many cases those filler metals which do not significantly affect the base metal properties do not have the characteristics required to fully utilize design properties such as corrosion resistance, high temperature strength, and toughness, which properties are normally obtained from mechanisms formed of the basis metals.

Diffusion bonding generally describes a solid state joining process in which no fusion is involved, no deleterious foreign material is added, and the joint is made only by self diffusion or solid state reactions of the component materials under conditions of cleanliness, temperature and pressure. The metal to metal contact, essential to the process, is made by plastic deformation of the components, usually effected by creep. After the contact is made under ultraclean conditions, solid state diffusion takes place. The problem of establishing metal to metal contact under the ultraclean requirements is significant. To obtain contact by creep, however, requires time while cleanliness degrades with time. Establishing metal to metal contact by yield or plastic flow is often impractical, especially when applied to honeycomb sandwich panel structures.

SUMMARY OF THE INVENTION

In accordance with the present invention, a combined liquid and solid state diffusion process, hereinafter sometimes referred to as the liquid interface diffusion process, for the bonding of various structures, particularly those formed of titanium, is provided which substantially obviates the problems of the prior art diffusion bonding processes while retaining the advantages thereof. Specifically, a small amount of three or more selected metals are interposed between the faying edges of the materials to be bonded, to form a diffusion bridge. The materials are then heated in a protective atmosphere from ambient temperature to a higher temperature wherein the solid state diffusion occuring while heating forms a eutectic area which will become liquidus at a temperature lower than the melting temperature of any of the metals involved in the process. The temperature is increased to a predetermined level and is held sufficiently long to cause the eutectic area to again solidify and further dilute by solid state diffusion the bridge metals and titanium to enable the formation of a predetermined alloy at the point of bonding. The heating source is then removed and the temperature is lowered by a predetermined cooling period to ambient while maintaining the protective atmosphere. When bonding the new beta titanium alloys an additional heat curing step is required for restoring the desirable characteristics of the alloy lost during the bonding phase.

Interposition of the bridge materials between the faying surfaces to be bonded preferably is accomplished by placement of a thin layer of the selected metals or alloy on the edges of the honeycomb core in laminar form. This placement may be accomplished by any suitable means such as by brush or dip electroplating, vapor deposition, and powder flame spray. Dip or brush applied electroplating is preferred wherein the electroplating process provides control of the volume and placement of the plated materials.

The materials used as the liquid interface are selected in view of metallurgical considerations and, depending on the basis material, may form a nonreactive melt, or when reacted with the substrate may form a low melting phase, a eutectic or minimum or an allotropic transformation. The primary purpose of this interface is to establish the requisite metal to metal contact and resultant diffusion bridge between the faying surfaces so that automatic transport is effected and the post solid satte diffusion is accelerated whereby a stabilized diffusion bonded joint is achieved rapidly and fillets are also formed to augment the properites of the joined structure such as fatigue, shear and flatwise tensile strength.

Various means may be employed to fixture the assembly of components preparatory to bonding of the same by the combined liquid interface diffusion process of the present invention. For example, various arrangements for developing differential pressure may be employed of which a pressure pillow-hard vacuum arrangement is preferred. Other arrangements include the use of a vacuum pressure-rarified argon or other insert gas arrangement and the use of thermal differential expansion such as disclosed in Thomas A. Herbert U.S. Pat. No. 3,128,734 for "Apparatus for Making Curved Sandwich Panels."

Various means may be employed to apply the heat, such as, for example, as by use of air, atmosphere or hard vacuum furnaces, radiation heaters such as quartz lamps or gas burners, or integral electrical resistance heaters such as disclosed and claimed in Thomas A. Herbert U.S. Pat. Nos. 2,984,732 and 3,033,973, both entitled "Apparatus and Method for Brazing Honeycomb Sandwich Panels." Of these, heating in a hard vacuum is preferred.

Effective cleaning of the titanium is an important phase of the overall plating and liquid interface diffusion bonding of the honeycomb core-sandwich panel structures, and this preferably is accomplished by cleaning baths such as disclosed in Earl W. Kendall U.S. Pat. Nos. 3,228,816 for "Process for Cleaning and Polishing Aluminum and its Alloys" and 3,379,645 for "Process and Composition for Removing Protective Paint Films." The plating of the titanium preferably is accomplished by methods and baths such as disclosed and claimed in Earl W. Kendall application for patent, Ser. No. 765,155, filed Oct. 4, 1968, for "Method of Plating Titanium and its Alloys," which includes an electrolytic activator composition disclosed and claimed in Earl W. Kendall patent application, Ser. No. 600,362, filed Dec. 9, 1966, for "Electrolytic Descaling of Titanium and its Alloys."

OBJECTS OF THE INVENTION

An object of the present invention is to provide a new and improved method of forming a stabilized diffusion bonding joint at reduced temperature and in shorter time.

Another object is to provide a bonded joint which in the forming thereof combines desirable features of both liquid and solid state diffusion bonding methods.

Still another object is to provide a process of producing a liquid interface at the faying surfaces of parts to be diffusion bonded to develop a diffusion bridge and accelerated atomic diffusion therebetween without impairing the properties of the basis materials of the joined parts or adding appreciably to the weight thereof.

A further object is to provide a combined liquid and solid state diffusion bonding method for joining the core and facing sheets of metallic honeycomb sandwich panel structures, particularly those formed of titanium.

Still a further object is to reduce overall weight addition when bonding titanium core to facing sheets.

Still a further object is to provide a liquid interface and solid state diffusion bonding process and resultant joined structure characterized by grain formation of the basis materials across the bonded joint and dilution of the brazing materials within the region of the joint.

Still a further object in a combined liquid interface diffusion bonding process and resultant joint is to control the amount and placement of the laminations of the bridge metals and the temperature at which the resulting eutectic alloy formation at the joint becomes liquidus to form the required liquid interface at the faying surfaces of the parts to be bonded.

Yet another object is to restore the desirable features of beta type titanium alloys that may be lost during the heat cycle required for diffusion bonding.

Still other objects, features and advantages of the present invention will become more fully apparent as the description proceeds, reference being had to the accompanying drawings wherein:

SPECIFICATION

The present application relates to bonding of titanium and titanium alloy material, specifically honeycomb.

The application is related to my copending applications Ser. No. 765,156, filed Oct. 4, 1968, Ser. No. 888,501, filed Dec. 29, 1969 for "Combined Brazing-Diffusion Method of Bonding Metallic Honeycomb Sandwich Panel Structures" and Ser. No. 99,061 filed Dec. 17, 1970 for "Liquid Interface Diffusion Method of Bonding Titanium and Titanium Alloy Honeycomb Sandwich Panel Structure," these applications also have the same assignee as the instant application, wherein bonding was performed with different bridge materials and different processes were involved. The present invention is directed to an improvement in the process and method of the copending applications.

Figure 1:
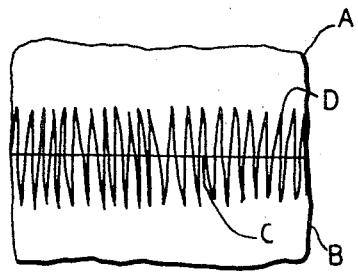
FIG. 1 is a graphic representation of the diffusion bonding of parts under ideal conditions.
Figure 2:
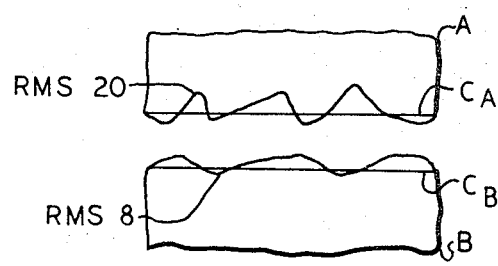
FIG. 2 is a micrographic showing of the true surface condition of real parts.

Reference is now directed to the drawings, and first more particularly to FIGS. 1 and 2, for a more complete understanding of the invention.

In the theoretical showing of FIG. 1, it is assumed that parts A and B are perfectly flat and clean and fit together perfectly along their common surface or interface C. Under such ideal conditions, the spacing between the parts would be compatible with the interatomic distances between metal atoms and instantaneous bonding of parts would occur without requiring atomic diffusion. Actually, the parts are neither perfectly flat nor clean. As shown in FIG. 2, wherein micrographic portions of parts A and B are shown at many times magnification, the actual RMS 20 surface condition of part A deviates considerably from its nominal flat surface $C_A$, and the actual RMS 8 surface condition of part B also deviates from its nominal flat surface $C_B$. In order to achieve diffusion bonding as represented at D in FIG. 1, it normally becomes necessary to establish an ultraclean condition of the parts, and to employ high pressure and temperature for extended periods of time without causing gross deformation and degradation of mechanical properties which might result from use of excessive time, temperature, or pressure.

According to prior art methods, diffusion bonding may be considered fast or slow. So-called "rapid" methods utilize resistance welding equipment or the like, to achieve bonding within seconds, or fractions thereof, and are yield-stress controlled, that is, they utilize pressures which exceed the material strength at bonding temperature. The so-called "slow or long-time" processes, such as autoclave pressure bonding which may require many hours to achieve bonding, are described as creep controlled in that extended time is required to establish metal to metal contact across the interfacial voids before atomic diffusion can begin. The rapid processes require ultraclean surface conditions, but because of the short exposure times and high pressure engagement of the parts, the bonded parts are less subject to physical property damage due to the presence of atmospheric impurities. The slow processes, by contrast, are not so critical with respect to surface cleanliness but require a protective atmosphere or hard vacuum to prevent contamination and loss of properties.

Figure 3:
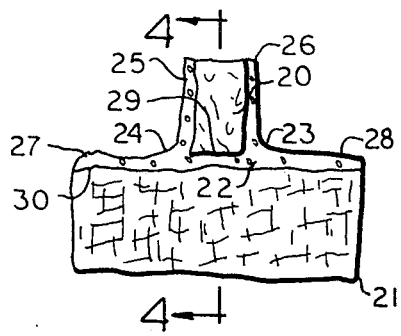
FIG. 3 is a micrographic showing of a typical brazed joint.
Figure 4:
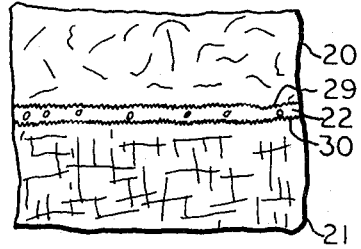
FIG. 4 is a sectional view as seen along the line 4—4 of FIG. 3.

A typical brazed joint of a honeycomb panel sandwich structure is disclosed in FIGS. 3 and 4 from which it may be seen that the honeycomb core wall 20 is joined to the facing sheet 21 by the brazing alloy 22 which desirably forms the joint strengthening fillets 23 and 24, but also often forms of the undesired extended regions 25, 26 and 27, 28 which excessively add to the weight of the panel structure. The braze alloy actually adds an additional component to the joined assembly, and this component often lacks the desired physical properties of the basis materials.

Figure 5:
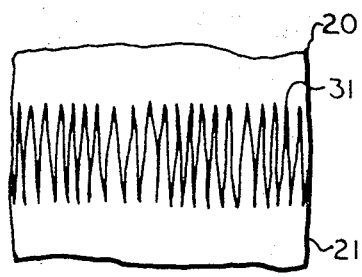
FIG. 5 is a graphic representation of the condition of complete dilution of the braze filler shown in FIG. 4.

The zigzag lines 29 and 30 depicted in FIGS. 3 and 4 at the interface of the braze alloy 22 with the core 20 and with the facing sheet 21 represent a condition in which more or less of the brazing material, as an incidence of the brazing operation, has diffused into the basis materials or has reacted therewith. A condition in which all of the braze alloy either fully reacted with the basis materials or has become diluted therewithin is represented at 31 in FIG. 5 as providing an undesirable zone in which degradation of the physical properties of the sandwich panel structure has occurred.

Figure 6:
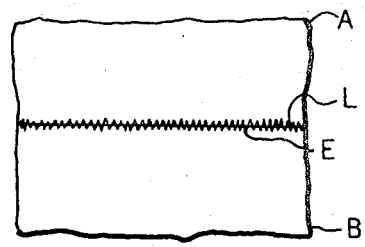
FIG. 6 is a graphical showing of the liquid interface and diffusion bridge at the faying surfaces of parts to be bonded in accordance with the process of the present invention.
Figure 7:
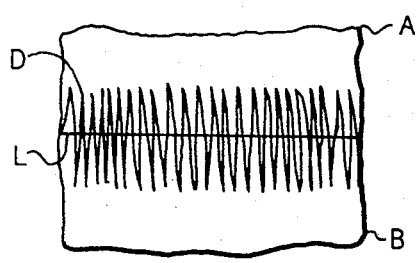
FIG. 7 is a graphical representation of the atomic diffusion and atom transport of the basis materials effected by the diffusion bridge of FIG. 6.
Figure 8:
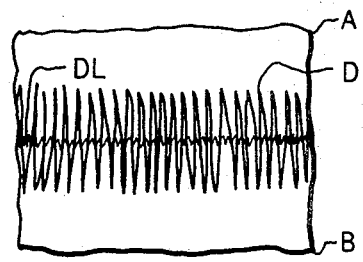
FIG. 8 is a graphical representation of the atom transport of FIG. 7 and additionally showing dilution of the bridge materials.

FIGS. 6 to 8 graphically represent features and resultant effects characteristic of the liquid interface-diffusion bonding process of the present invention and the bonded joint produced thereby.

In FIG. 6, the line E represents solid state diffusion that takes place by the placement of a small amount of bridging material on the engaging surfaces of at least one of the parts to be bonded and heating the parts and interposed bridging material. The line L represents a liquid interface at the fayed surfaces of part A and B where an eutectic alloy formed by the solid state diffusion E of the bridge material has reached a temperature to become liquidus.

This temperature is raised slightly and maintained for a period of time sufficient to cause the eutectic alloy to again solidify and continue the solid state diffusion as depicted at D in FIG. 7. Also occurring during this diffusion phase is the further dilution of the diffusion bridge material L into the region of the diffusion joint D as depicted at $D_L$ in FIG. 8.

Figure 16:
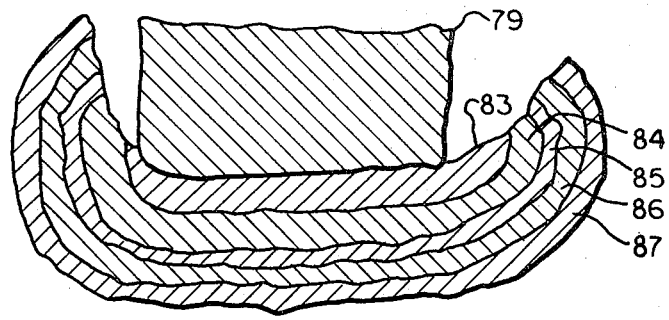
FIG. 16 is a greatly enlarged, framentary, sectional micrograph of an edge portion of a honeycomb core member showing successive platings of different metals in a preferred sequence for forming the liquid interface on at least one of the faying surfaces to be joined by means of the present invention.

Although not limited thereto the process of the present invention is particularly well suited to the bonding of honeycomb sandwich panel structures formed of titanium and its alloys. The micrograph of FIG. 13 discloses, at about 2500 times magnification, a diffusion bonded joint between the core sidewall 32 and its facing sheet 33 of a sandwich panel structure formed of commercially pure (C.P.) titanium. This titanium panel was bonded by the process in accordance with the time-temperature and time-vacuum curves disclosed in FIG. 12 and FIG. 17 for alpha-beta and beta titanium respectively. The micrograph clearly evidences atomic transport and resultant diffusion of the basis titanium materials across the bonded joint between the core sidewall and its facing plate. The micrograph, in the region of the joint, also clearly evidences dilution of the bridge materials therewithin, that is, dilution of the bridge materials which, in the instance of this example, constituted a triple laminar electrolytic plating of Nickel 83 and 87, Copper 84 and 86 and Silver 85 on the face of the honeycomb core as shown in FIG. 16. One half the total nickel was the first plating layer, one half the total copper the second layer, all of the silver the center layer, then the remaining one half of the total copper and nickel. These layers respectively constitute 19 percent nickel, 19 percent copper, 24 percent silver, 19 percent copper and 19 percent nickel by weight of laminar placement. This placement layer increased the weight of the panel structure by 1 to 3 gram per square inch. The micrograph further clearly evidences the formation of fillets 34 and 35.

The surfaces of titanium, due to the presence of oxides and other films, are in a passive state and therefore are not receptive to the placement of a metallic plating thereon. These films cannot be removed by acid attack and, accordingly, the plating of titanium has heretofore been considered difficult to accomplish, if at all. As disclosed and claimed in the aforementioned copending application of Earl W. Kendall, Ser. No. 765,155, filed Oct. 4, 1968, for "Method of Plating Titanium and Its Alloys," use of the electrolytic activator bath disclosed therein so treats and conditions the titanium surfaces that it has become possible to successfully plate titanium with metals such as Ag, Au, Cu, Ni, Sn, In, An, Cr, Co, Cd, Fe, Rh, Re, Sb and other metals.

Reference is directed to this copending application for further details of the plating bath and process. It suffices herein to state that the titanium honeycomb core to be plated and the facing sheets to be bonded therewith are first immersed in a suitable cleaner to remove surface contaminants such as mill marks, finger prints, solids, oils, etc. A solution which is effective for the purpose is available commercially as Brantner 1315 and is substantially the same composition as disclosed and claimed in Bus. Pat. No. 3,379,645 of Earl W. Kendall, assigned to the assignee of the instant application. Brantner 1315 is a non-aqueous cleaner operative at ambient room temperature of 70° to 90° F. and consisting of from 15 – 25 grams of chromic acid ($CrO_3$) for each 175 – 225 grams of concentrated sulfuric acid (sp. gr. 1.84). A preferred composition of this cleaner solution operable for cleaning purposes herein consists of 10 grams of powdered chromic acid ($CrO_3$) for each 100 mls. of concentrated sulfuric acid (sp. gr. 1.84). This preferred solution is operative upon immersion of the titanium articles therein to remove the surface contaminants within from 1 to 5 minutes.

Figure 9:
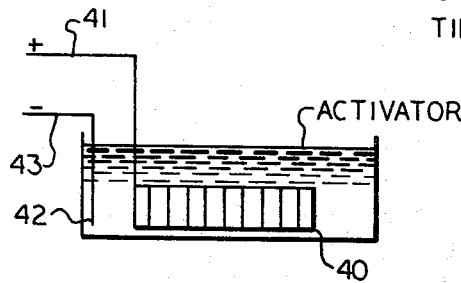
FIGS. 9 and 10 are pictorial showings of electrolytically operated activator and plating baths, respectively.

The titanium articles are next subjected to the action of the electrolytic bath disclosed in FIG. 9. This bath is basically a descaling solution effective to remove pyrolytic refractory oxides from the surfaces of titanium and ferrous alloys including such metals as nickel, chromium, cobalt, tungsten, vanadium and molybdenum. It is available commercially as Brantner 2226 and is substantially the same composition as disclosed and claimed in the aforementioned copending application of Earl W. Kendall, Ser. No. 600,362, and assigned to the assignee of the instant application.

This descaling solution is operated at ambient temperature of the order of 70° to 90° F. and consists of the following constituents and proportions thereof by volume of the bath:

Acetic Acid (Glacial) 55 – 70%
Sulfuric Acid (concentrated) 20 – 30%
Hydrofluoric Acid (48–50%) 10 – 15%
Inhibitor (Amide-acetylenic alcohol mixture) 0.3 – 0.5%
Wetting Agent (Anionic Surfactant) 0.2 – 0.3%.

In the preferred descaling composition, the acetic-sulfuric-hydrofluoric acid proportions are as follows by volume of the bath:

Acetic Acid (Glacial) 70%
Sulfuric Acid (Concentrated) 20%
Hydrofluoric Acid (70%) 10%.

As disclosed in FIG. 9, the titanium part, for example, core 40, is the anode in the electrolytic system, the positive (+) lead 41 being connected thereto. The cathode 42, which is immersed in the descaling bath, is connected to the negative (–) lead 43. The cathode electrode 42 may be formed either of carbon or copper.

The descaling bath is used to prepare the titanium panel components for the liquid interface diffusion bonding process aforesaid, and provides the requisite stringent surface clean conditions required for these liquid and solid state diffusion operations. The descaling bath also serves to activate the core 40 to render the same receptive to the plating operation, subsequently to be described. Thus, the panel facing skins are subjected to the electrolytic action of the bath of FIG. 9 by immersion therein for 5 to 10 minutes with 2 – 3 volts applied across the input leads $41^{(+)}$ and $43^{(-)}$. The core 40, which must additionally be sufficiently activated to receive and hold the plating to be applied to its edge faces is immersed in the activator bath of FIG. 9 for 5 to 10 minutes with 4 – 5 volts applied across the input leads $41^{(+)}$ and $43^{(-)}$.

Prior to plating the activated core 40, it is preferred to brighten the surfaces thereof by immersion in a suitable brightener bath to remove any smut or other surface conditions which may result from the action of the activator bath. Brantner 2226B is commercially available and is preferred. Brantner 2226B is substantially the same composition as disclosed and claimed in the aforementioned U.S. Pat. No. 3,228,816 of Earl W. Kendall, which patent is assigned to the assignee of the instant application. This brightener solution is an aqueous bath and operates for purposes herein at ambient room temperature of the order of 70° to 90°F. The bath consists of the following constituents and proportions thereof per 100 mls. of aqueous solution:

0.1 – 1.0 gram urea
8 – 12 mls. nitric acid (42°B's.)(1.42 sp. gr.)
4 – 6 grams boric acid
1 – 1.5 gram ammonium bifluoride.

The preferred brightener composition consists of:
Urea 0.5% by weight of the aqueous solution
Nitric Acid 10.0% by volume of the aqueous solution
Boric Acid 5.0% by weight of the aqueous solution
Ammonium Bifluoride 1.0% by weight of the aqueous solution.

Figure 10:
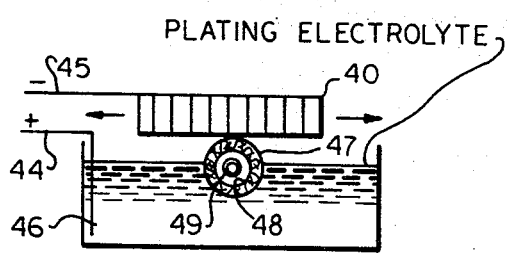

The core 40 is now ready for plating of the edge facings thereof by the electroplating system of FIG. 10 wherein it will be understood that the conventional commercially available plating electrolyte has the requisite composition to supply at the core faces the particular metal to be plated thereon. The plating method disclosed is similar to the well known Dalic or Selectron Brush type plating process, and the current and voltage supply and controls afforded by that process conveniently may be employed to energize the leads $44^{(+)}$ and $45^{(-)}$ of FIG. 10 as required herein to practice the plating process.

As disclosed in FIG. 10, lead $44^{(+)}$ is connected to the anode electrode 46 which is immersed in the plating electrolyte and is insoluble therein. Lead $45^{(-)}$ is connected directly to core 40 which is mounted over and above a roller 47 for reciprocal rolling movement of its edge faces therealong parallel to the surface of the bath as depicted by the arrows in FIG. 10. Roller 47 is immersed in the bath to a depth therein not to exceed the order of 75 percent of its diameter.

Roller 47 comprises a tube formed of polyvinyl chloride (PVC) which is wrapped with a single layer 48 of gauze such as tube gauze manufactured by the Dalic Plating Process Company, the ends of the tubing gauze being tucked within the PVC tube. A glass tube 49 which is about ½ the diameter of the PVC tube is inserted therein and provides the roller bearing support for the roller, the ends of glass tube 49 being journalled in holes or notches (not shown) provided in the sidewalls of the plating tank 50.

Rolling movement of core 40 on roller 47 causes the roller to rotate and move the electrolyte picked up thereby to the core face in contact therewith, thereby to complete the current path from the electrolyte to the core. Since the core is mounted for rolling movement above the roller, the electrolyte tends to move by gravity away from the core to thus minimize any tendency of the electrolyte to move by capillary action or otherwise up and along the cell walls where plating is not desired. The plating is thus limited or restricted to the edges of the core where it is desired and where the thickness of the plating is determined by the time and current density employed.

Figure 11:
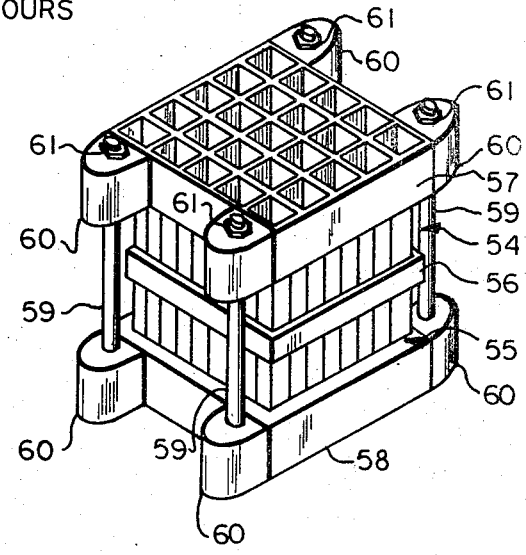
FIG. 11 is a schematic showing of a fixturing arrangement for use in practicing the brazing-diffusion bonding process of the present invention.

Referring now to FIG. 11, a suitable fixturing or tooling arrangement is disclosed for retaining the cleaned, activated and plated panel parts in assembled relation preparatory to the brazing-diffusion bonding of the same. Panel assemblies generally designated 54 and 55 may be considered to represent two assemblies each having a core and its oppositely disposed facing sheets, or each assembly may be considered to comprise two or more separate assemblies of a core and its facing sheets. In either case, assemblies 54 and 55 are disposed on opposite sides of a schematically depicted pressure device 56 for evenly distributing the panel loading thereon. Pressure device 56, referred to as a pressure pillow may be a well known so-called pressure bag which may simply comprise two flexible metallic sheets sealed at the edges and having provision for admitting air under pressure therein. Pressure device 56 may comprise one or more sheets of flexible heat resistant dielectric cloth-like material available as "Refrasil" or "Fiberfrax." The sheets form a resilient cushion and provide an alternative arrangement to the pressure bag.

So-called "strongbacks" or reference plates 57 and 58 are disposed above and below the panel assemblies 54 and 55. These are formed as eggcrating of a suitable material such as 300 series stainless steel to provide a greater extend of thermal expansion of the eggcrating than the rods 59 which retain the same in assembled relation to the panel components, the rods being formed of a suitable material such as 400 series stainless steel which has a coefficient of thermal expansion less than that of the strongback eggcrating members. Lugs 60 are attached as by welding to the perimeters of members 54 and 55 to receive the rods which are held in clamping relation to the strongback members as by the nuts 61 in threaded engagement with the rods.

It will be understood that the showing of FIG. 11 is schematic only and that other elements such as copper heat distribution and slip sheets (not shown) are also employed in the fixturing assembly.

Upon assembly of the panel parts and fixturing as shown in FIG. 11, the same are placed in a protective atmosphere for heating. As the heat increases toward the liquid diffusion temperature of the eutectic formed by solid state diffusion of the bridge materials on the cores, differential expansion of the strongbacks 57, 58 and rods 59 causes the requisite contact pressure to be developed between the cores and facing sheets of the panel assemblies 54 and 55. With reference to the curve of FIG. 12 for alpha titanium, this contact pressure is fully developed prior to the liquid interface diffusion phase of the process cycle depicted, this being at about 1400°F. and at about two and one-half hours after the start of the cycle. Liquidus occurs somewhere in the neighborhood of 1400°F., and solidus again occurs shortly after 1700°F. is reached as a result of the liquid diffusion action. Holding the material at about 1700°F. for about one hour causes the materials to be diffused in the basis materials by solid state diffusion action. The thermally developed contact pressure continues after solidus occurs, it being augmented by the cushion or pillow.

Figure 12:
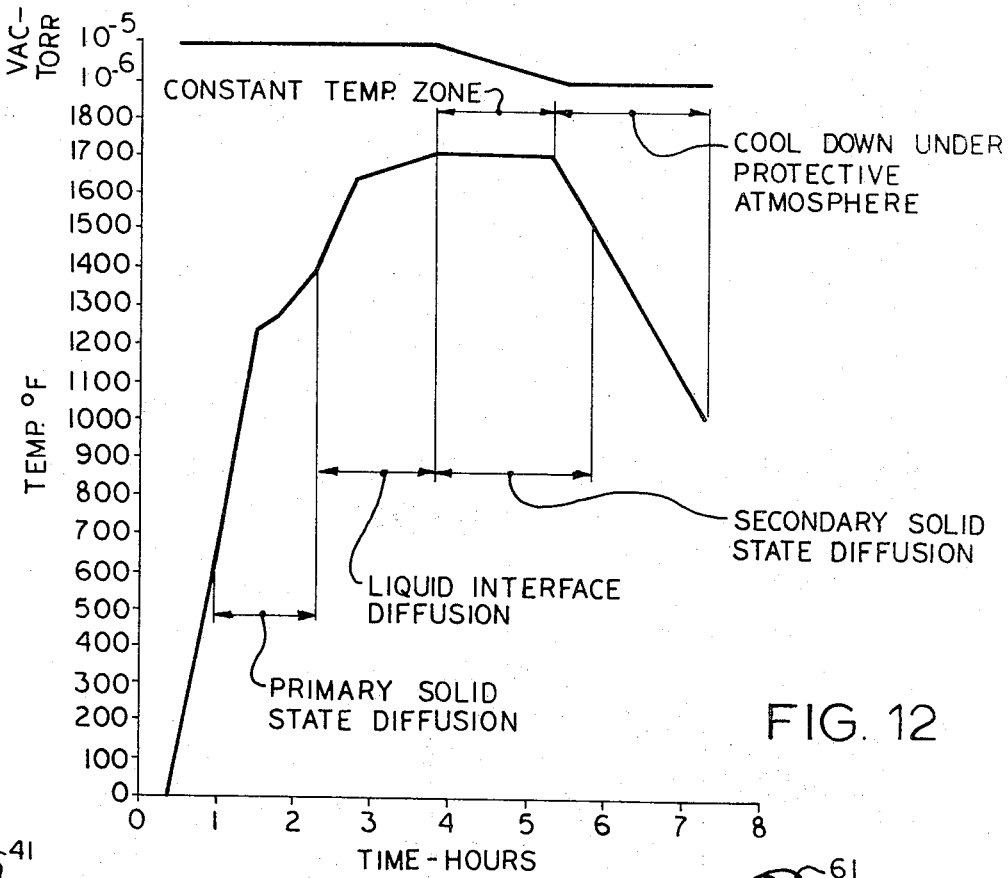
FIG. 12 is a graph showing a typical bonding cycle for alpha titanium obtained in the practice of the combined liquid interface-diffusion bonding process of the present invention.
Figure 13:
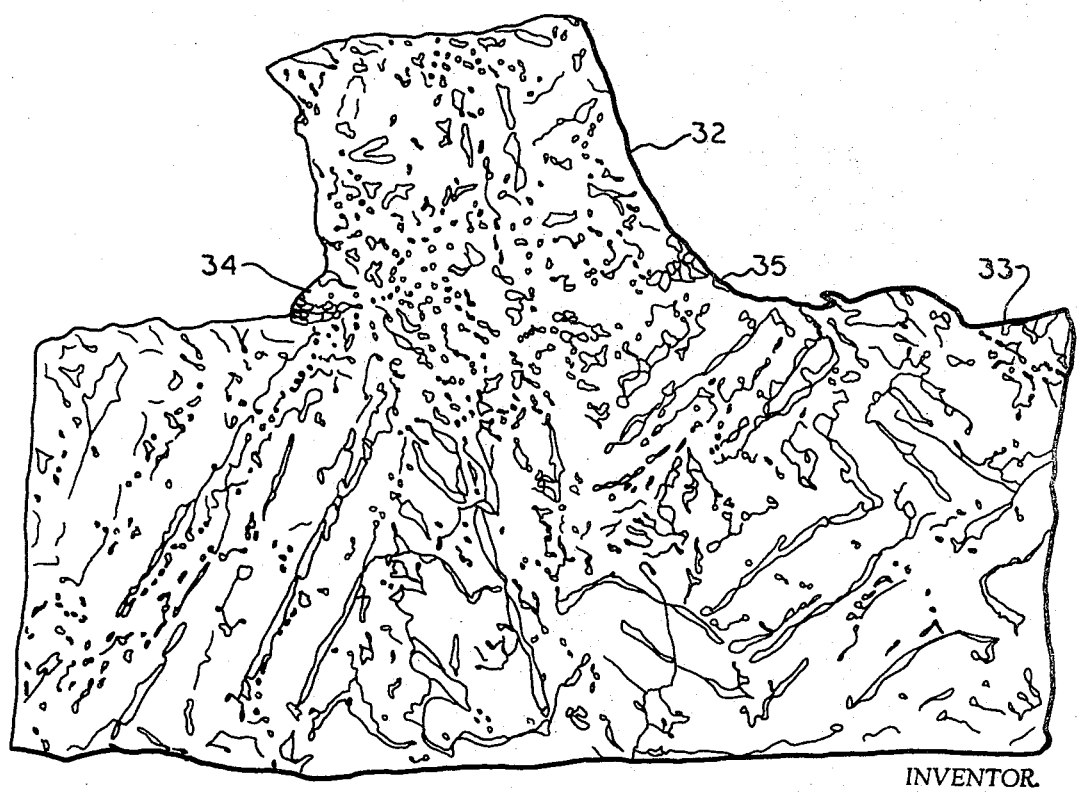
FIG. 13 is a micrograph of bonded structure produced in accordance with the bonding process of the present invention.

During the secondary solid state diffusion phase of the cycle depicted in FIG. 12, the aforementioned solid state diffusion of the basis materials and the dilution of the diffusion bridge materials occur, this being for a period of about one hour and at a constant temperature of about 1700°F. and then reduced at a rate of not more than 7°F. per minute until about 1500°F. is reached. The system is then further reduced to 1000°F. or less. At the start of the cycle, the hard vacuum employed is of the order of $10^{-5}$ Torr and increases to and maintains a constant level of about $10^{-6}$ Torr during the secondary diffusion phase and controlled cool down phase. After 1000°F. or less is obtained the system may be vented to atmosphere if desired.

From the foregoing, it will be apparent that by choosing tooling materials which have a different thermal growth rate than that of the part, material pressure and configuration may be accurately applied to the part without auxiliary systems. For example, in a simple $\Delta \alpha$ tooling system involving a round part, the system is comprised only of the part and a mandrel. There are no diaphrams, tubes, or any of the auxillary systems required by other concepts. As the assembly is heated the mandrel expands at a higher rate than the part. By dimensional precalculation combined with component thermal sizing operations it is possible to establish the temperature at which the mandrel and part meet. The meeting point is designed to be below the brazing temperature thereby assuring contact pressure. In this example, there may be a large differential in diameters of the mandrel and part at temperatures upwards of 1200°F. By choosing other mandrel materials this difference could be changed if desired. For example by choosing a nickel alloy mandrel over a 300 series stainless steel mandrel the difference could be halved. However, a high differential expansion is sometimes desirable. In the case that the assumed part has a compound curvature, this requires that relatively large layup clearances be available.

The $\Delta \alpha$ tooling concept may be applied to other than round parts. Nearly any differential desired can be designed into such a system by proper choice of the materials. Flat parts such as the panel assemblies 54 and 55 depicted in FIG. 11 are considered to be the hardest configuration to which to apply the $\Delta \alpha$ tooling system.

Although the $\Delta \alpha$ tooling concept requires at atmosphere (inert or hydrogen) or vacuum furnace in most cases, it has many advantages such as the following:

It is ideal for hard vacuum furnace operation

It has low mass

It has good thermal balance

It requires no auxillary systems

It is easily purged

It may accommodate relatively large tolerance stackups

It allows reliable joint contact at required temperatures.

The aforementioned U.S. Pat. No. 3,128,734 of T. A. Herbert, Jr., which is assigned to the assignee of the instant application, discloses and claims an arrangement in which differential thermal expansion of fixturing members is utilized in the brazing of curved sandwich panels.

Heating methods for brazing honeycomb sandwich structure vary widely. The methods can be generally categorized in the following types:

1. Air furnace

2. Atmosphere furnace
3. Integral electrical resistance
4. Radiation
5. Hard vacuum furnace For the more exotic bonding, like titanium, a hard vacuum furnace is preferred. There are several reasons for this choice. The main advantage of vacuum heating of titanium is the lower oxygen contamination potential. Titanium is the best oxygen getter in the periodic table. If exposed to an atmosphere containing oxygen at temperatures above 1000°F. for long periods of time (long meaning over two hours) it will "get" the oxygen and the substrate will become irreversible degraded. As the temperature increases above 1000°F. the rate of oxygen contamination is accelerated. So at heating temperatures of 1700°F. it becomes imperative that oxygen be minimized. Hard vacuum of less than $10^{-5}$ Torr is about the best and most practical oxygen free system available. Another important feature is keeping the cleaned titanium which has been prepared for bonding in a clean condition. If, in any part of the heating cycle, oxygen or other impurities are allowed to contaminate the surface, bridge filler diffusion can be severely restricted.

Figure 15:
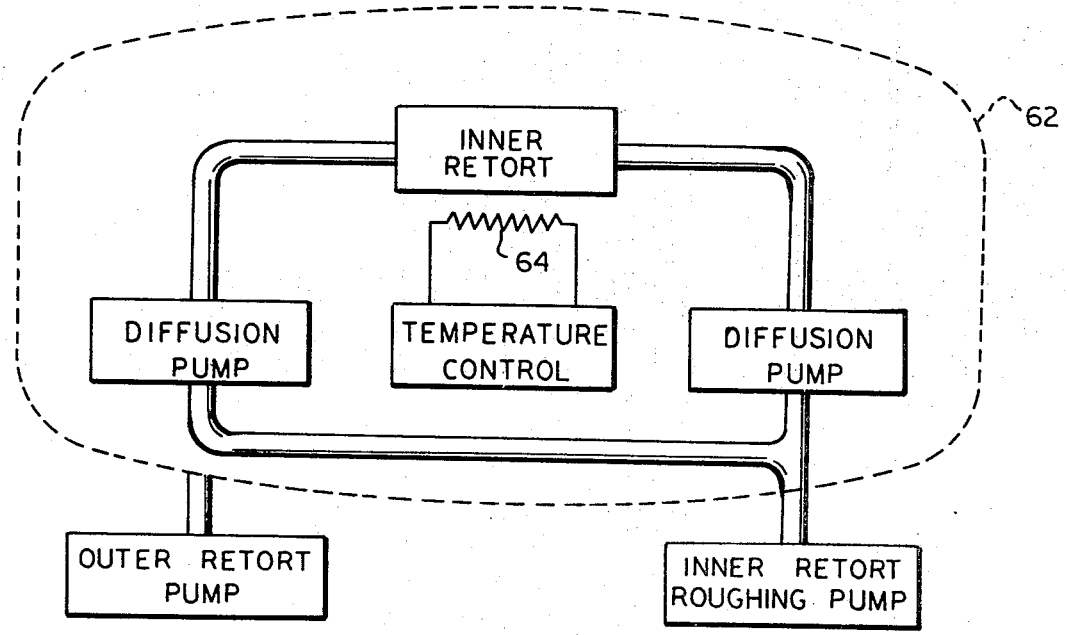
FIG. 15 is a block diagram view showing a dual vacuum differential pressure and localized heating system.

A dual vacuum bonding concept is disclosed in FIG. 15. This concept utilizes a series of small diffusion pumps connected in close proximity to the panel components which are enclosed in the inner retort. The entire system is housed in a large vacuum tight bell 62 which is pressurized with Argon. For example, with the panel assembly operating in a $10^{-5}$ Torr vacuum, the bell pressure may be such that 2 psia is applied to the panel assembly, this being the pressure which the core will sustain at the required temperature. Heating of the panel assembly can be by resistance heating elements or quartz lamps as depicted at 64 in FIG. 15.

Figure 14:
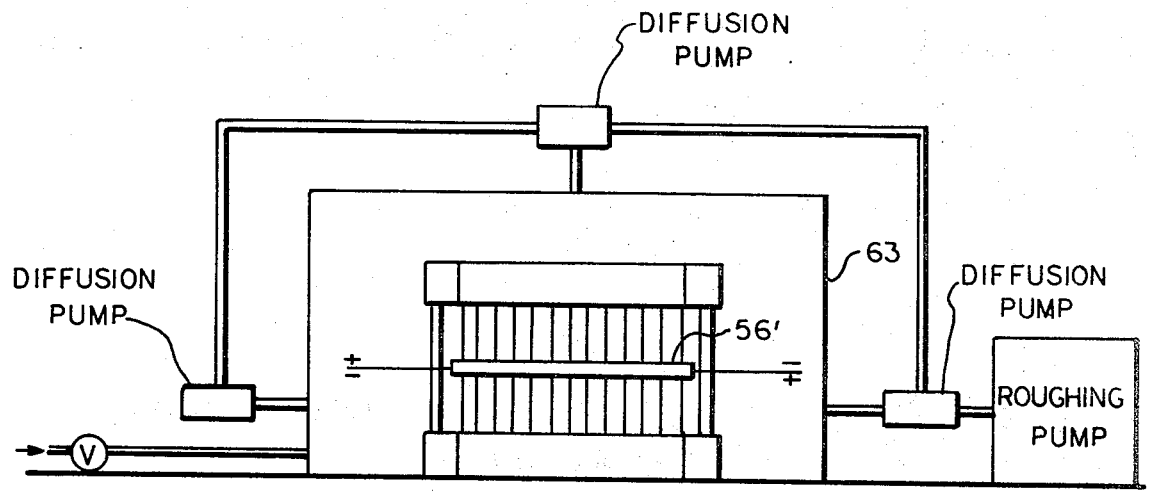
FIG. 14 is a schematic showing of a controlled environment and heating arrangement.

In the arrangement of FIG. 14, the assembly of FIG. 11 is disposed within a controlled environment provided by the chamber 63 which is pumped by the diffusion pump array and roughing pump system to provide a hard vacuum therein of the order of upwards of $10^{-5}$ Torr. In this arrangement, the device 56' is an electrical heating blanket, or the like, such as disclosed and claimed in U.S. Pat. No. 3,088,019 of R. E. Crump, which patent is assigned, in part, to the assignee of the instant application. In such a resistance heating arrangement, a flexible woven wire mesh heater element is sandwiched between sheets of Fiberfrax or Refrasil. The heater elements, of course, alternatively may be discreet nichrome ribbon elements as employed in the well known Glassrock process. In any case, such electrical heating systems employ the concept, disclosed and claimed in the aforesaid U.S. Pat. Nos. 2,984,732 and 3,033,973 of T. A. Herbert, assigned to the assignee of the instant application, wherein heat is generated electrically and locally with respect to the assembled panel components to be bonded and transferred thereto by conduction through a flexible heat resistant dielectric medium (Fiberfrax or Refrasil).

The valve disclosed in FIG. 14 provides a means of introducing an inert gas into the chamber 63 when this is desired, for example, after purging with the vacuum system.

A preferred sequence for the depositing of a selected series of metals for practicing the invention is shown in FIG. 16, which is a drawing of a greatly enlarged micrograph of the edge portion of titanium core material with the successive platings thereon. These platings comprise in sequence by layers 83 Ni, 84Cu, 85Ag, 86Cu and 87Ni. The proportionate total amounts of the plating metals are Ni 38 percent to 45 percent, Cu 38 percent to 45 percent and Ag 24 percent to 10 percent.

The Ag of the bridge material may be substituted with one of a group of low melting point metals including Sb, Bi, Cd, Sn or Zn, or precious metals including Au and Pt. It should be understood that FIG. 12 and FIG. 17 will change somewhat with respect to time and temperature as shown when the center layer of the bridge material is other than Ag. The total thickness of the interface plating preferably should be no greater than is required for sufficient diffusion with the basis material to form a good bonding composition of from 82 percent to 96 percent titanium at the joint.

Figure 17:
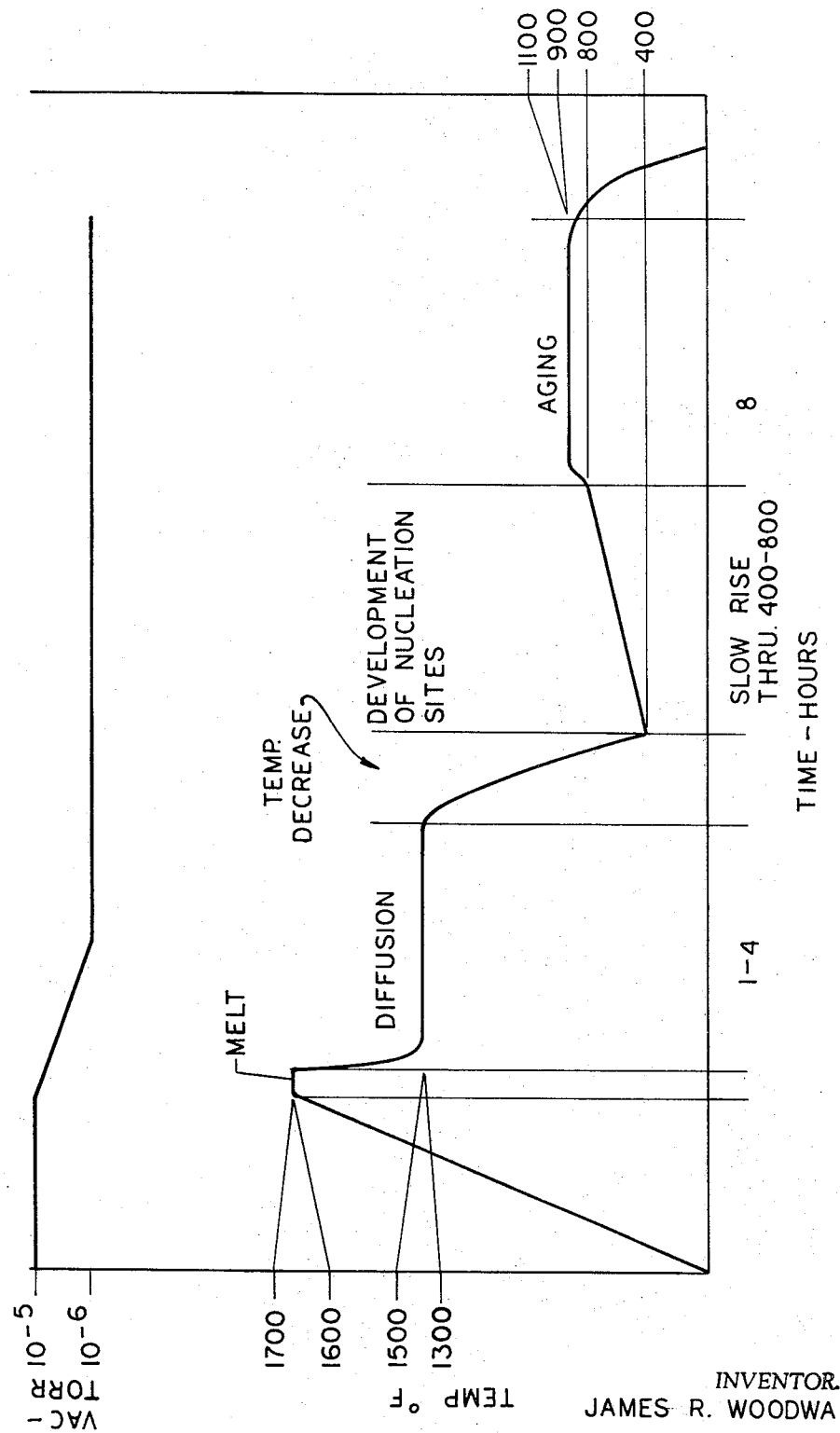
FIG. 17 is a graph showing a typical bonding and curing cycle for beta titanium obtained in the practice of the combined liquid interface-diffusion bonding process of the present invention.

Referring now to FIG. 17, the temperature versus time curve for beta type titanium alloys is different than that of the alpha-beta type titanium alloys as shown in FIG. 12. These differences are due to the fact that the characteristic grain growth and associated effects upon the all beta titanium are much more critical than other titanium alloys. The temperature required for the melt of the bridge material must be kept as low as possible and held for the shortest time possible to promote the required diffusion while keeping the metallurgical degradation in the form of a nucleation and increase of grain size of the basis metals to a minimum. The temperature and time most desirable has been found to be in the range of 1600°F. to 1700°F. for approximately 10 minutes. The melt temperature is then lowered to a temperature within the range between 1300°F. and 1500°F. The necessary diffusion will then occur within a reasonable length of time and will not cause degradation of the basis metals. This temperature should be close to the beta transus and is selected so that grain growth will not occur nor will the residual alpha precipitation sites be annealed. The temperature is then held at this level until the diffusion aid material has diluted into the basis metals to form a sufficient bond therebetween. When the diffusion cycle is completed, the temperature is then lowered at a rate dependent on tool cool down, while maintaining the protective atmosphere, and the temperature is then slowly raised from 400°F. to a temperature in the range of 800° F. This is the range of temperatures in which the omega phase is formed. The omega phase formation becomes finely dispersed and has the potential of acting as nucleation sites for the alpha precipitates. This provides for recovery of a sufficient portion of the alpha precipitation lost from the basis metals that occurs at the aforementioned high bonding temperature. Upon reaching approximately 800°F. wherein the time span between 400°F. and approximately 800°F. has provided the required alpha precipitation sites, the temperature is then raised to a level in the range of 900°F. to 1000°F. for aging. Since the omega phase is unstable above 850°F., it is eliminated during aging. Also, during the aging process, the beta phase becomes highly enriched in the beta stabilizing elements, thus preventing the omega phase from forming during subsequent use of the bonded basis metals at high temperature. The temperature is then lowered to ambient, wherein the bonding and aging cycles are completed. It should be noted that after the diffusion bonding cycle as shown in FIG. 17 is completed, the temperature may be lowered to ambient, as hereinbefore discussed, wherein the aging cycle is not performed until a later time. Equally satisfactory results occur whether the aging of the structure is performed immediately after diffusion or at some later time.

The invention provides a method for the diffusion bonding of titanium which obviates the necessity for distortion of the basis metals by either creep or yield stress, and which can be accomplished at less cost and in less time than has heretofore been possible.

This invention may be embodied in other forms or carried out in other ways without departing from the spirit or essential characteristics thereof. The present embodiments and examples of the invention are therefore to be considered as in all respects illustrative and not restrictive, the scope of the invention being indicated by the appended claims, and all changes which come within the meaning and range of equivalency of the claims are intended to be embraced therein.

Having thus described the invention, what is claimed as new and useful and desired to be secured by U. S. Letters Patent is:

1. The liquid interface diffusion method of bonding honeycomb core material to its facing sheets where said core and face sheets are made of beta titanium alloy material capable of exhibiting one omega phase which comprises the steps of:

depositing on the core edge surface laminated placement diffusion bridge materials consisting of laminates of Cu, Ni and Ag or Cu, Ni and one low melting point metal from the group consisting of Sb, Bi, Cd, Sn, Zn, Au and Pt;

placing together the faying surfaces to be bonded with said bridge material therebetween;

subjecting said faying surfaces to sufficient positive pressure to maintain position and alignment for joining;

while said faying surfaces are being so held in a protective atmosphere raising the temperature to range of about 1600°F to 1700°F to cause a melt of said bridge material, secondly lowering the temperature to range between about 1300°F and 1500°F and holding said temperature until the diffusion bridge material has diluted into the basis metals to form a sufficient bond therebetween; and aging the basis metals after the diffusion cycle is completed by lowering the temperature to a predetermined level and then slowly increasing the temperature through the range from about 400°F to about 800°F in which the omega phase becomes highly dispersed and there is sufficient alpha precipitation sites, then aging the basis metals by increasing the temperature to a level in the range of 900°F to 1000°F and holding the temperature for an additional period of time wherein the omega phase becomes unstable and is eliminated and the beta stabilizing elements of the basis metals become highly enriched and finally lowering the temperature to ambient.

2. The method in claim 1 wherein said bridge material laminates are nickel, copper and silver.

3. The method in claim 2 wherein said bridge material laminates are deposited in five separate layers.

4. The method in claim 2 wherein the center laminate has the lowest melting point.

5. The method of claim 2 wherein the bridge material laminates are sequentially nickel, copper, silver, copper and nickel.

6. The method in claim 2 wherein the center laminate is a metal other than nickel or copper.

7. The method in claim 2 wherein the two laminations of nickel and copper are equal and consist of from 75 percent to 90 percent of the total weight of the laminates.

8. The method in claim 2 wherein the center laminate metal is equal to from 10 percent to 24 percent of the total weight of the laminates.

9. The method in claim 1 wherein the protective atmosphere is a hard vacuum.

10. The method in claim 1 wherein the protective atmosphere is an inert gas.

11. The method in claim 1 wherein diffusion between the bridge material and the basic metals takes from 1 to 4 hours.

12. The method in claim 1 wherein the beta titanium alloy material is sufficiently deburred and cleaned prior to the metal laminates being deposited thereon.

13. The method in claim 1 wherein after the diffusion cycle is completed the temperature is lowered to 400°F. or less.

14. The method in claim 1 wherein the aging time is approximately 8 hours.

* * * * *